US011118922B2

(12) United States Patent
Rao et al.

(10) Patent No.: US 11,118,922 B2
(45) Date of Patent: Sep. 14, 2021

(54) USER CONTROL OF ALTERNATE ROUTES

(71) Applicant: Uber Technologies, Inc., San Francisco, CA (US)

(72) Inventors: Shailendra Ramineni Rao, Palo Alto, CA (US); Wesley KaiJie Leung, San Francisco, CA (US); Jayant Balasubramanian Sai, Santa Clara, CA (US); Kumar Chowdhary Veeravalli Naveen, Castro Valley, CA (US); Seth Alan Woolley, Portland, OR (US); Janice Jieun Suh, Brooklyn, NY (US); Paweena Attayadmawittaya, Oakland, CA (US)

(73) Assignee: Uber Technologies, Inc., San Francisco, CA (US)

( * ) Notice: Subject to any disclaimer, the term of this patent is extended or adjusted under 35 U.S.C. 154(b) by 289 days.

(21) Appl. No.: 16/261,983

(22) Filed: Jan. 30, 2019

(65) Prior Publication Data

US 2020/0240803 A1 Jul. 30, 2020

(51) Int. Cl.
*G01C 21/34* (2006.01)
*G01C 21/36* (2006.01)
*G06F 3/0482* (2013.01)

(52) U.S. Cl.
CPC ..... *G01C 21/3484* (2013.01); *G01C 21/3438* (2013.01); *G01C 21/3469* (2013.01); *G01C 21/3679* (2013.01); *G06F 3/0482* (2013.01)

(58) Field of Classification Search
CPC ............ G01C 21/3834; G01C 21/3453; G01C 21/34; G01C 21/3856; G01C 21/3469;
(Continued)

(56) References Cited

U.S. PATENT DOCUMENTS 7,512,487 B1 * 3/2009 Golding ............. G01C 21/3492
701/424
8,639,654 B2 * 1/2014 Vervaet ................. G01C 21/32
707/602
(Continued)

FOREIGN PATENT DOCUMENTS

CN     104331422    * 10/2014  ............ G06F 17/30
CN     105383495 A  *  3/2016  ............ B60W 40/00
(Continued)

OTHER PUBLICATIONS

Fan, Xiaoyi et al; "Crowdsourced Road Navigation: Concept, Design, and Implementation"; Jun. 2017, IEEE Communications Society, IEEE Communications Magazine June Edition, p. 6 (Year: 2017).*

(Continued)

*Primary Examiner* — Peter D Nolan
*Assistant Examiner* — Kenneth M Dunne
(74) *Attorney, Agent, or Firm* — Schwegman, Lundberg & Woessner, P.A.

(57) ABSTRACT

Systems and methods for reconciling a conflict between a rider-selected route and driving preferences of a driver are provided. In example embodiments, a networked system accesses driving preferences of the driver, wherein the driving preferences include preferences derived from past selection of routes by the driver. The networked system detects the conflict between characteristics of the rider-selected route and the driving preferences and determines one or more routes from a location of a vehicle of the driver to a destination based on the driving preferences. The network system reconciles the rider-selected route with the driving preferences by replacing at least one segment of the rider-selected route with at least one segment from the one or more routes to generate a reconciled route. The reconciled
(Continued)

route is then displayed on a user interface of a device of the driver.

20 Claims, 9 Drawing Sheets

(58) Field of Classification Search
CPC ............ G01C 21/3438; G01C 21/3679; G01C 21/3484
See application file for complete search history.

(56) References Cited

U.S. PATENT DOCUMENTS

| | | | |
|---|---|---|---|
| 8,682,574 B2* | 3/2014 | Golding | G01C 21/36 |
| | | | 701/411 |
| 8,718,925 B2* | 5/2014 | Letchner | G01C 21/3484 |
| | | | 701/410 |
| 9,116,010 B2* | 8/2015 | Pryakhin | G01C 21/26 |
| 2005/0021225 A1* | 1/2005 | Kantarjiev | G01C 21/3691 |
| | | | 701/527 |
| 2009/0005965 A1 | 1/2009 | Forstall et al. | |
| 2015/0185020 A1* | 7/2015 | Gimpl | G01C 21/3438 |
| | | | 701/537 |
| 2017/0254656 A1* | 9/2017 | Bhogal | G01C 21/3484 |
| 2018/0188049 A1* | 7/2018 | Shi | G01C 21/3484 |
| 2018/0335308 A1* | 11/2018 | Zavesky | G01C 21/3629 |

FOREIGN PATENT DOCUMENTS

| | | | | |
|---|---|---|---|---|
| DE | 19605458 C1 * | 9/1997 | | G08G 1/0968 |
| EP | 2338742 A1 * | 6/2011 | | B60R 16/037 |

OTHER PUBLICATIONS

"Your Rank and Points—Wazeopedia", waze.com, May 29, 2017, p. 2 (Year: 2017).*

"International Application Serial No. PCT US2020 015879, Invitation to Pay Additional Fees dated May 6, 2020", 11 pgs.

"International Application Serial No. PCT US2020 015879, International Search Report dated Jun. 30, 2020", 6 pgs.

"International Application Serial No. PCT US2020 015879, Written Opinion dated Jun. 30, 2020", 10 pgs.

"International Application Serial No. PCT US2020 015879, International Preliminary Report on Patentability dated Jun. 9, 2021", 10 pgs.

* cited by examiner

USER CONTROL OF ALTERNATE ROUTES

TECHNICAL FIELD

The subject matter disclosed herein generally relates to special-purpose machines for determining routes between locations, and to the technologies by which such special-purpose machines become improved compared to other machines that determine routes. Specifically, the present disclosure addresses systems and methods that allow users to control alternate routes determined based on machine-learned preferences.

BACKGROUND

Conventionally, when a driver uses a driving navigation system, the driver can, if desired, establish a limited number of preferences. For example, the driver may be able to manually indicate that they want to avoid highways, avoid tolls, or avoid ferries. Based on these preferences, one or more routes are determined between a current location and a destination of the driver. Typically, the one or more routes are determined and presented based on estimated time of arrival (ETA).

BRIEF DESCRIPTION OF THE DRAWINGS

Some embodiments are illustrated by way of example and not limitation in the figures of the accompanying drawings.

DETAILED DESCRIPTION

Figure 1:
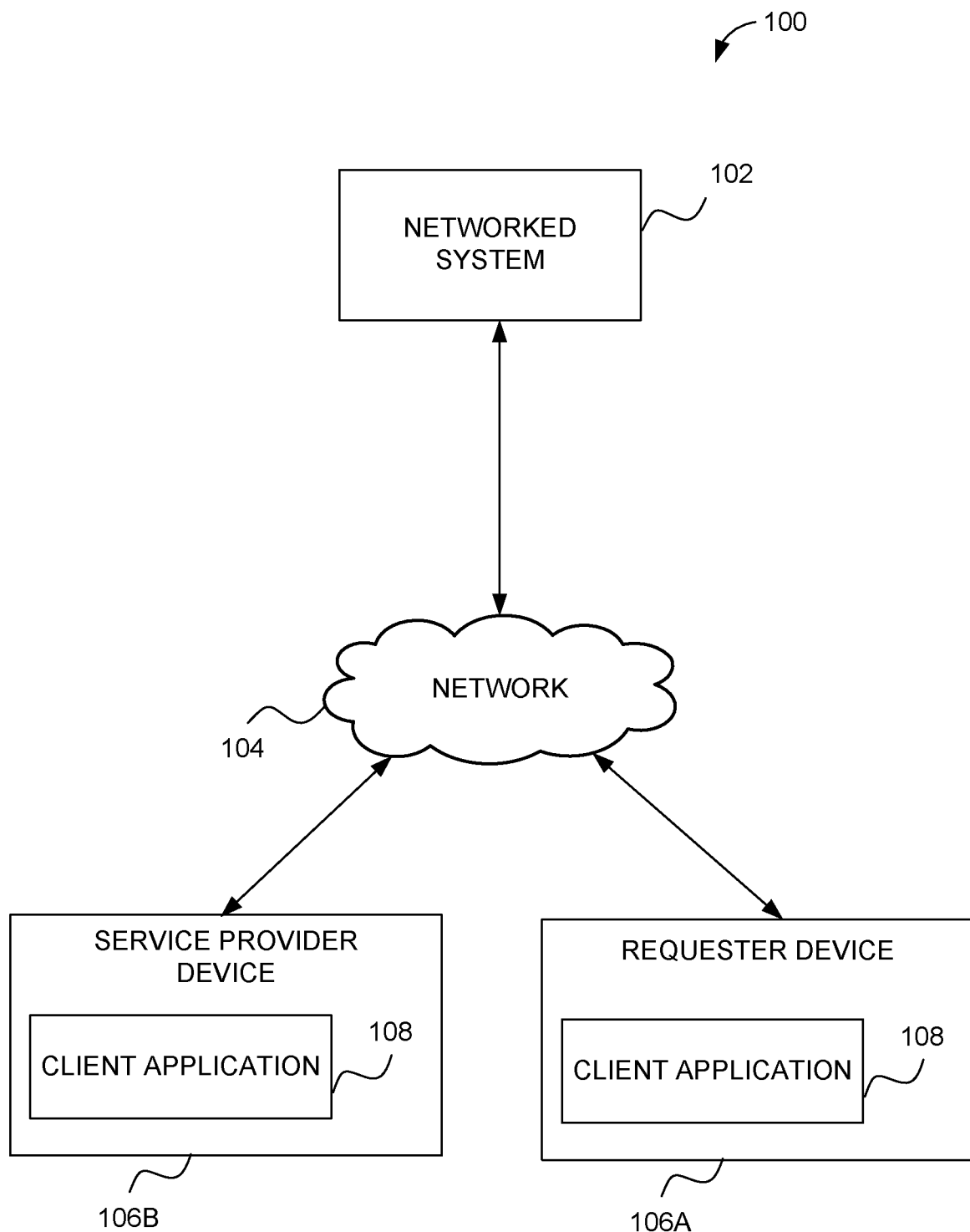
FIG. 1 is a diagram illustrating a network environment suitable for providing user control of alternate routes, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for providing user control of alternate routes. Specifically, example embodiments dynamically determine a plurality of routes between a current location and a destination based on preferences derived (e.g., machine-learned) from past selection of routes. In some embodiments, the user having control of the alternate routes is a driver of a vehicle that is transporting a rider or an item to the destination. In these embodiments, a networked system identifies a current location of the driver and the destination and accesses driving preferences of the driver, whereby the driving preferences include preferences derived from past selection of routes (e.g., favorite routes, avoids freeways, avoids hills). The networked system then determines a plurality of routes between the current location and the destination based on the driving preferences and causes presentation of the plurality of routes on a user interface of a device of the driver.

In other embodiments, the user having control of the alternate routes is a rider of a ride-sharing service. In these embodiments, the networked system receives a ride request from the rider which indicates a destination or drop-off location (terms used interchangeably herein). The networked system identifies a current location of the user and determines a plurality of routes between the current location and the destination. The plurality of routes is determined, in example embodiments, based on preferences of the rider derived from past selection of routes (e.g., past selected routes, avoids a particular section of town, avoids a particular area at certain times). The networked system causes presentation of the plurality of routes on a user interface of a device of the rider, and the rider provides, via the user interface, a selection of a route from the plurality of routes. In response to the selection, the networked system causes presentation of a driving route corresponding to the selected route on a device of the driver and the device of the rider.

In further embodiments, both the driver and the rider have control of alternate routes. In these embodiments, the networked system negotiates and reconciles any conflicts between the selection of a route of the rider and driving preferences of the driver. For example, the networked system accesses driving preferences of the driver in response to receiving the route selection by the rider and determines whether there is a conflict between the selected route and driving preferences of the driver. In response to a determination of a conflict, the networked system determines at least one driver route based on the driving preferences of the driver for the same current location and destination. The networked system, in some cases, automatically reconciles the rider selected route and the at least one driver route to create the driving route that is displayed and utilized on both the driver and rider devices. In other cases, the networked system triggers a negotiation process between the driver and rider, via their respective devices, to derive the driving route.

Thus, example methods (e.g., algorithms) and example systems (e.g., special-purpose machines) are configured to improve a navigation process using machine-learned preferences of users. Therefore, one or more of the methodologies described herein facilitate solving the technical problem of providing navigation information tailored to a user's preferences in a networked environment (e.g., ride sharing service, food or item delivery service).

FIG. 1 is a diagram illustrating a network environment 100 suitable for providing user control of alternate routes in navigating from a current location to a destination, according to example embodiments. The network environment 100 includes a networked system 102 communicatively coupled via a network 104 to a requester device 106a and a service provider device 106b (collectively referred to as "user devices 106"). In example embodiments, the networked system 102 comprises components that obtain, store, and analyze data received from the user devices 106 and other sources in order to machine-learn and dynamically update preferences of the users (e.g., a requester or a service provider), whereby the preferences are used to derive alternate routes for the users. The components of the networked system 102 are described in more detail in connection with FIG. 2 and may be implemented in a computer system, as described below with respect to FIG. 6.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 interact with the networked system 102 through a client application 108 stored thereon. The client application 108 of the user devices 106 allow for exchange of information with the networked system 102 via user interfaces as well as in the background. For example, the client application 108 running on the user devices 106 may determine location information of the user devices 106 (e.g., current location in latitude and longitude), and the location information is provided to the networked system 102, via the network 104, for storage and analysis. In particular, the location information is used by the networked system 102 to determine at least one route from a pick-up location to a destination.

In example embodiments, a user (e.g., a rider) operates the requester device 106a that executes the client application 108 to communicate with the networked system 102 to make a request for transport or delivery service (referred to collectively as a "trip"). In some embodiments, the client application 108 determines or allows the user to specify a pickup location (e.g., of the user or an item to be delivered) and to specify a drop-off location for the trip. The client application 108 also presents information, from the networked system 102 via user interfaces, to the user of the requester device 106a. For instance, the user interface can display alternate routes from a pick-up or current location of the user and allow the user to select one of the routes.

A second user (e.g., a driver) operates the service provider device 106b to execute the client application 108 that communicates with the networked system 102 to exchange information associated with providing transportation or delivery service (e.g., to the user of the requester device 106a). The client application 108 presents information via user interfaces to the user of the service provider device 106b, such as invitations to provide transportation or delivery service, navigation instructions, alternate routes, and pickup and drop-off locations of people or items. The client application 108 also provides a current location (e.g., coordinates such as latitude and longitude) of the service provider device 106b to the networked system 102.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. Additionally, some of the functions of the user device 106 may be embodied within the networked system 102. While only a single networked system 102 is shown, alternative embodiments may contemplate having more than one networked system 102 to perform server operations discussed herein for the networked system 102.

Figure 2:
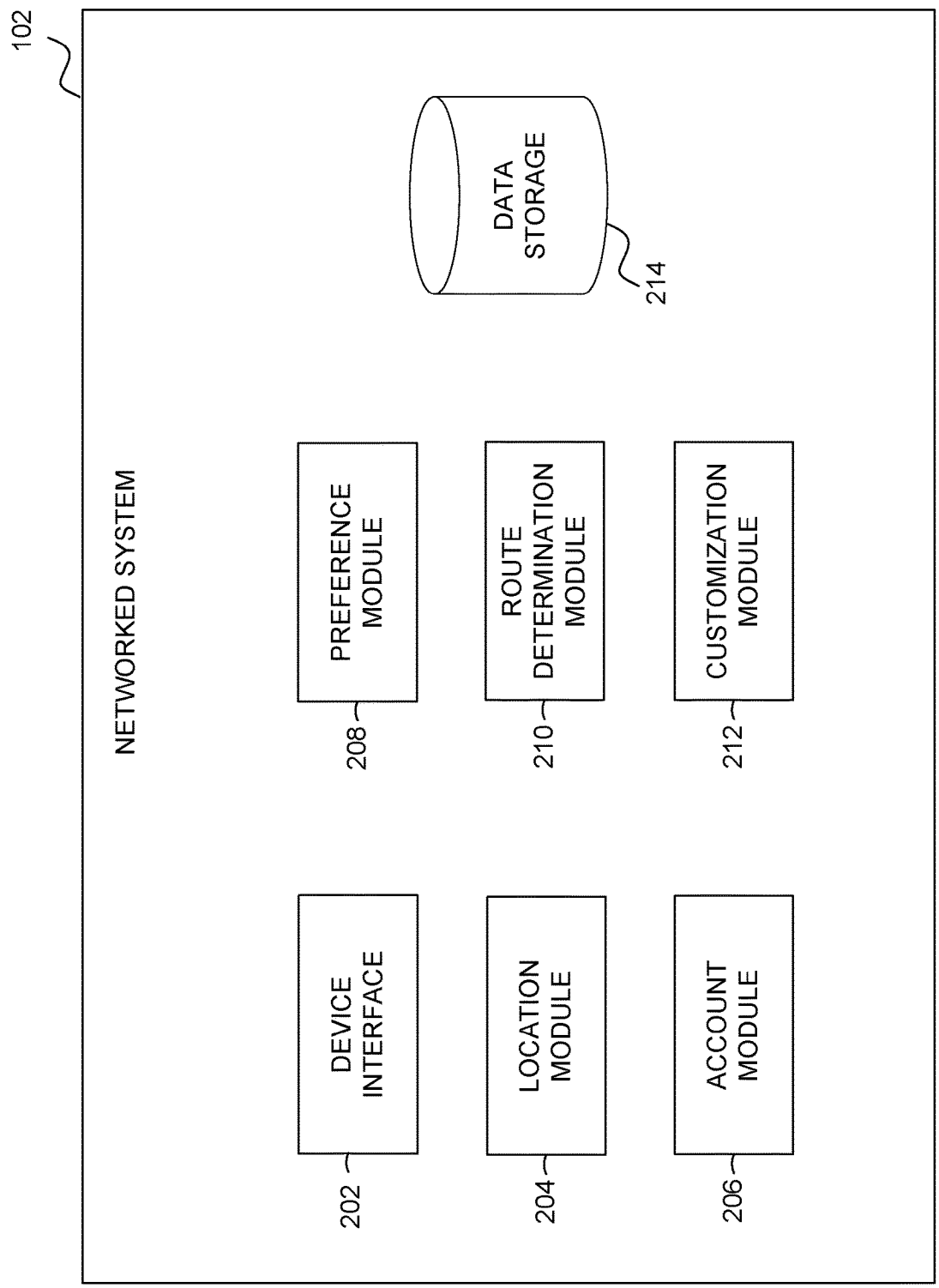
FIG. 2 is a block diagram illustrating components of a networked system for providing user control of alternate routes, according to some example embodiments.

FIG. 2 is a block diagram illustrating components of the networked system 102, according to some example embodiments. In various embodiments, the networked system 102 obtains and stores trip information (e.g., pick-up and drop-off locations, routes, selection of routes) received from the user devices 106, analyzes the trip information to dynamically update preferences of each user, and uses the preferences to determine alternate routes. To enable these operations, the networked system 102 comprises a device interface 202, a location module 204, an account module 206, a preference module 208, a route determination module 210, a customization module 212, and a data storage 214 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the user devices 106 and cause presentation of one or more user interfaces on the user devices 106 including user interfaces having alternate route and navigation information. In example embodiments, the device interface 200 generates and transmits instructions (or the user interfaces themselves) to the user devices 106 to cause the user interfaces to be displayed on the user devices 106. The user interfaces can be used to request transport or delivery service from the requester device 106a, display invitations to provide the service on the service provider device 106b, present alternate routes, and provide navigation instructions. At least some of the information received from the user devices 106 are stored to the data storage 214.

The alternate routes displayed to the user can be labeled, by the device interface 202, in order for the user to quickly identify why particular routes are presented. The labels are, in some embodiments, provided by the route determination module 210. For example, the plurality of routes displayed to a rider may indicate that a first route is the cheapest, a second route is the fastest (and may include timing information), and a third route is a rider's preferred route (e.g., chosen a threshold number of times in the past) or the rider's last route between the same locations. The plurality of routes displayed to a driver may, for example, indicate one or more of a fastest route, a route that avoids highways, a most fuel-efficient route (e.g., avoids hills), a route that has a higher probability of picking up a second rider along the way (e.g., for a pool driving scenario), the shortest route, a route that avoids freeways, and so forth.

The data storage 214 is configured to store information for each user of the networked system 102. The information includes various trip data used by the networked system 102 to machine-learn preferences of each user. In example embodiments, the data is stored in or associated with a user profile corresponding to each user and includes the preferences as well as a history of interactions using the networked system 102. While the data storage 214 is shown to be embodied within the networked system, alternative embodiments can locate the data storage elsewhere and have the networked system 102 communicatively coupled to the networked system 102.

The location module 204 manages locations (e.g., pick-up location, drop-off location, current location) for each user. In example embodiments, the location module 204 receives, via the network 104 and device interface 202, device information including a location information (e.g., coordinates) of the user device 106. The location information may be obtained by a global positioning system component associated with the user device 106. The location module 204 analyzes (e.g., extracts, parses) the location information to identify one or more of a pick-up location, a drop-off location, or a current location of the user device 106 and the user.

The account module 206 manages user profiles/accounts and preferences at the networked system 102. In some embodiments, the account module 206 receives, from the user, explicit preferences. For example, the user may establish a set of one or more preferences such as avoid freeways/highways, avoid tolls, avoid bridges, or avoid hills. The account module 206 also receives, stores (e.g., in the data storage 214), and updates preferences learned by the preference module 208.

The preference module 208 learns (e.g., machine-learns) preferences for each user. In example embodiments, the preference module 208 analyzes trip information received by the networked system 102 to learn (e.g., identify, determine, derive) one or more preferences. In one embodiment, the preference is the route chosen by the user. For example, if the preference module 208 detects that the user consistently selects a same route between a first location and a second location, that route becomes a preference or preferred route for the user. Consistency can be based on a threshold (e.g., selects the same route at least 50% of the time; has selected the route at least a certain number of times). In another example, the preference module 208 notes as a preference, the last selected route between the first and second locations regardless of consistency.

In other embodiments, the preference module 208 learns, from the trip information, a pattern of the user. For example, if the user consistently (e.g., based on a predetermined threshold) chooses routes that avoid highways (e.g., does not pick a route with a highway or picks a route with the least amount of distance driven on highway a threshold number of times), the preference module 208 identifies a preference to avoid or limit highways. In another example, if the user consistently (e.g., exceeding a predetermined threshold) chooses routes that avoids hills and the networked system 102 knows the user drives an electric vehicle or hybrid, the preference module 208 identifies a preference to avoid hills or to conserve vehicle battery usage in the electric vehicle.

In yet another example, the preference module 208 detects that the user is a frequent contributor to user generated content (UGC) that identifies, reports, or verifies data regarding locations (e.g., location has moved or closed; address is correct or incorrect, poor pick-up location, poor drop-off location), road conditions (e.g., construction in a particular area, closure of streets, traffic, accidents, turn not allowed), errors in routes (e.g., wrong exit), or other data that the user reports to the networked system 102. In response, the preference module 208 identifies a preference for providing UGC for the user. Other preferences can be learned by the preference module 208 and are not limited to the examples provided herein.

In some embodiments, the preference module 208 identifies a level of a preference. For instance, if the user almost always avoids highways, the preference module 208 notes a high preference to avoid highways. In another example, if the user only occasionally (e.g., less than 10% of the time) avoids hills, the preference module 208 notes a low preference to avoid hills. All of the learned preferences can then be stored to the data storage 214.

The route determination module 210 manages the determination of a plurality of (alternate) routes based on the preferences of the user. In some embodiments, the route determination module 210 determines a plurality of routes from a current location of a vehicle to a destination based on the machine-learned driving preferences of the driver. In other embodiments, the route determination module 210 determines a plurality of routes from a current location of a rider to a drop-off location based on machine-learned preferences of the rider. In these embodiments, the plurality of routes is determined and displayed to the rider prior to the driver picking up the rider, upon start of a trip immediately after the rider is picked up, or while the rider is traveling between the pick-up location and the destination.

In order for the route determination module 210 to determine the plurality of routes, the route determination module 210 accesses (e.g., via the preference module 208 and/or the account module 206) the preferences of the user (e.g., the driver, the rider, or both). In one embodiment, the route determination module 210 identifies several routes from a first location (e.g., pick-up location; current location) to a second location (e.g., destination or drop-off location). The route determination module 210 then applies the preferences to the identified routes to determine a top number (e.g., three) of alternate routes. In an alternative embodiment, the route determination module 210 reviews preferences before generating the alternative routes. For example, one of the alternate routes is a last route chosen between the two locations or a consistency chosen route between the two locations. Another alternate route can be one that only traverse city streets based on a strong preference for avoiding highways. Additionally, the route determination module 210 can identify carpool specific routes based on the fact that the rider will be in a vehicle with the driver resulting in at least two people being in the vehicle.

In other embodiments, the route determination module 210 identifies and includes one or more routes that have a higher probability that a second rider can be picked-up along the way (e.g., to account for potential for a pooled ride). In some cases, the routes having a higher probability are along a segment where pool riders typically are picked-up. In other cases, the routes having a higher probability are along heavily traveled or more populated segments, thus increasing a probability that one or more additional riders can request a ride while the driver is traveling in the same area.

In some embodiments, weighting is applied by the route determination module 210. For example, if the user has a strong preference for avoiding freeways and a low preference for traveling along a scenic route, the route determination module 210 can apply a higher weight or coefficient to avoiding freeways and a lower weight for traveling along a scenic route. In these embodiments, the top number of alternate routes comprises the highest scoring routes based on the weighting.

In embodiments where the rider selects the route, the route determination module 210 may also determine whether there is a conflict with the driving preferences of the driver. For example, the rider selects the fast route between two locations, which requires traversing two large hills. If the driver has a strong preference to avoid hills, then there is a conflict. In these embodiments, the route determination module 210 can determine a driver route based on the driving preferences of the driver. The route determination module 210 then reconciles the rider selected route with the driver route to derive the driving route that is eventually used to navigate to the destination. For example, the route determination module 210 replaces one segment of the rider selected route (e.g., hilly portion) with a segment from the driver route (e.g., along a bottom of hills). Alternatively, the route determination module 210 applies the driver's preferences directly to the rider selected route and replaces the hilly portion with a less hilly portion. In some cases, the derived driving route is presented to both the rider and driver, via their respective user devices 106, along with a request to agree to the derived driving route. If one of the users does not agree, the route determination module 210 can derive an alternate driving route and present the alternate driving route to the users or initiate a negotiation process between the driver and rider via their user devices 106 (e.g., ask rider if they are willing to avoid the hill). This can continue until both users agree on the driving route.

The customization module 212 manages user customization of a route. In example embodiments, the user is shown one or more routes on their user interface. If the user does not like any of the routes, an option to customize a route is provided by the customization module 212. The customization module 212 allows the user to select a route that comes closest to the route they want to take and allows the user to move nodes (or points) along the route to change one or more segments of the route. Once the route is customized by the user, the customization module 212 saves the customized route in the profile of the user for future reference. The preference module 208 also makes note of the customized route and, in some embodiments, use the customized route as a preference.

Figure 3:
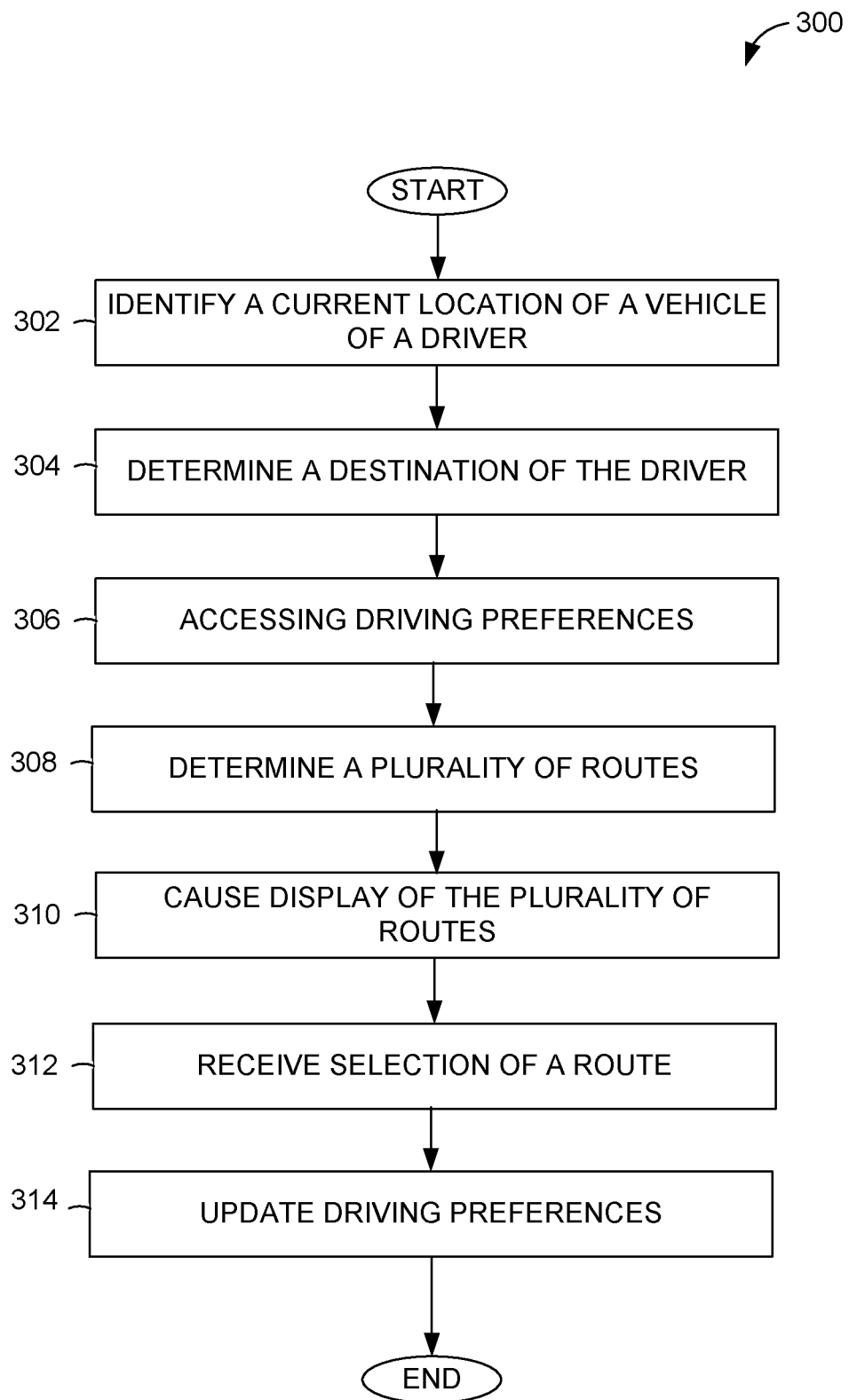
FIG. 3 is a flowchart illustrating operations of a method for providing driver control of alternate routes, according to some example embodiments.

FIG. 3 is a flowchart illustrating operations of a method 300 for providing driver control of alternate routes, according to some example embodiments. Operations in the method 300 may be performed by the networked system 102, using components described above with respect to FIG. 2. Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, a current location of a vehicle of a driver is identified by the location module 204. In example embodiments, the location module 204 receives, via the network 104 and device interface 202, location information (e.g., coordinates) from the user device 106. The location module 204 analyzes the location information to identify the driver's current location (e.g., current location of the user device 106 of the driver). In some cases, the current location is a pick-up location of an item or rider.

In operation 304, a destination of the driver is determined by the location module 204. In some embodiments, the destination is a drop-off location of a rider or item that the driver is transporting. In these embodiments, the location module 204 can obtain the destination from a service request (e.g., a ride request or delivery request) that includes the destination. In some embodiments, the destination is a pick-up location (e.g., restaurant for picking up food) for a delivery service.

In other embodiments, the destination comprises a gas station or a location for a facility break (e.g., bathroom break; food break; coffee break). For example, the driver indicates (or the vehicle indicates) that the vehicle needs fuel. As such, the location module 204 identifies gas stations within a predetermined distance of the driver. In another example, the driver indicates that they would like to stop for lunch or coffee. Here, the location module 204 identifies restaurants or coffee shops within a predetermined distance of the driver. In some embodiments, the location module 204 takes the driver's preferences into consideration in identifying gas stations and facility break locations. For example, if the driver regularly gets coffee from Starbucks, then the location module 204 identifies Starbucks within a predetermined distance of the current location (or particular Starbucks the driver typically goes to).

In operation 306, the driving preferences of the driver are accessed. In example embodiments, the route determination module 210 accesses (e.g., via the preference module 208 and/or the account module 206) the preferences of the driver. The preferences are stored in a user profile/account managed by the account module and stored in the data storage 214.

In operation 308, the route determination module 210 determines a plurality of routes from the driver's current location to the destination. In one embodiment, the route determination module 210 identifies several routes from the current location to the destination. The route determination module 210 then applies the preferences to the identified routes to determine a top number (e.g., three) of alternate routes. For example, one of the alternate routes can be a last route chosen between the two locations or a consistency chosen route between the two locations. Another alternate route can be one that only traverse city streets based on a strong preference for avoiding highways.

Alternatively, the route determination module 210 analyzes the preferences to determine the most important or strong preferences the driver has. Using this analysis, the route determination module 210 then identifies (e.g., generates) the routes that best satisfy these preferences. For example, if the driver has a strong preference to avoid crossing bridges, the route determination module 210 generates routes that do not cross any bridges.

In some embodiments, weighting is applied by the route determination module 210 in determining the plurality of routes. For example, if the user has a strong preference for avoiding downtown during rush hour, the route determination module 210 can apply a higher weight or coefficient to avoiding downtown during rush hour versus during other times of the day. As such, the preferences can also include a time element. For example, the driver can take particular routes during certain days or during particular times on particular days.

In embodiments where the driver has indicated that they need gas or want to take a facility break, the route determination module 210 can include a "preference" to increase a probability that the driver will quickly receive a service request while near the destination (e.g., gas station, restaurant, coffee shop). The route determination module 210 then identifies and includes one or more routes that have a higher probability that a service request will occur (e.g., a ride request from a rider or a delivery request of an item). In some cases, the routes having a higher probability are along a segment where riders typically are picked-up. In other cases, the routes having a higher probability are along heavily traveled or more populated segments.

In the delivery service embodiment, the route determination module 210 determines a plurality of routes to enter and pick up the item to be delivered (e.g., food). The plurality of routes may include a location to park the driver's vehicle and a path to an entrance of the pick-up location.

In operation 310, the plurality of routes is displayed on a user interface of the user device 106 of the driver. In example embodiments, the device interface 202 generates and transmits instructions (or the user interfaces themselves) to the user devices 106 to cause display of the plurality of alternate routes.

In operation 312, a selection of one of the plurality of routes is received by the device interface 202. The selection of the route is stored in the user's account by the account module 206.

In operation 314, the driving preferences of the driver are updated by the selection of the route. In example embodiments, the preference module 208 machine learns preferences for the driver by analyzing trip information received by the networked system 102. Thus, the preference module 208 analyzes the selected route to identify preferences that would cause the driver to select the route over other routes. In some cases, the analysis occurs after each route selection. In other cases, the analysis occurs in a batch mode (e.g., when a threshold number of selected routes is reached; once a week). The driving preference are then updated after the analysis. In some embodiments, the preferences do not change, so operation 314 is not necessary after every analysis.

Figure 4:
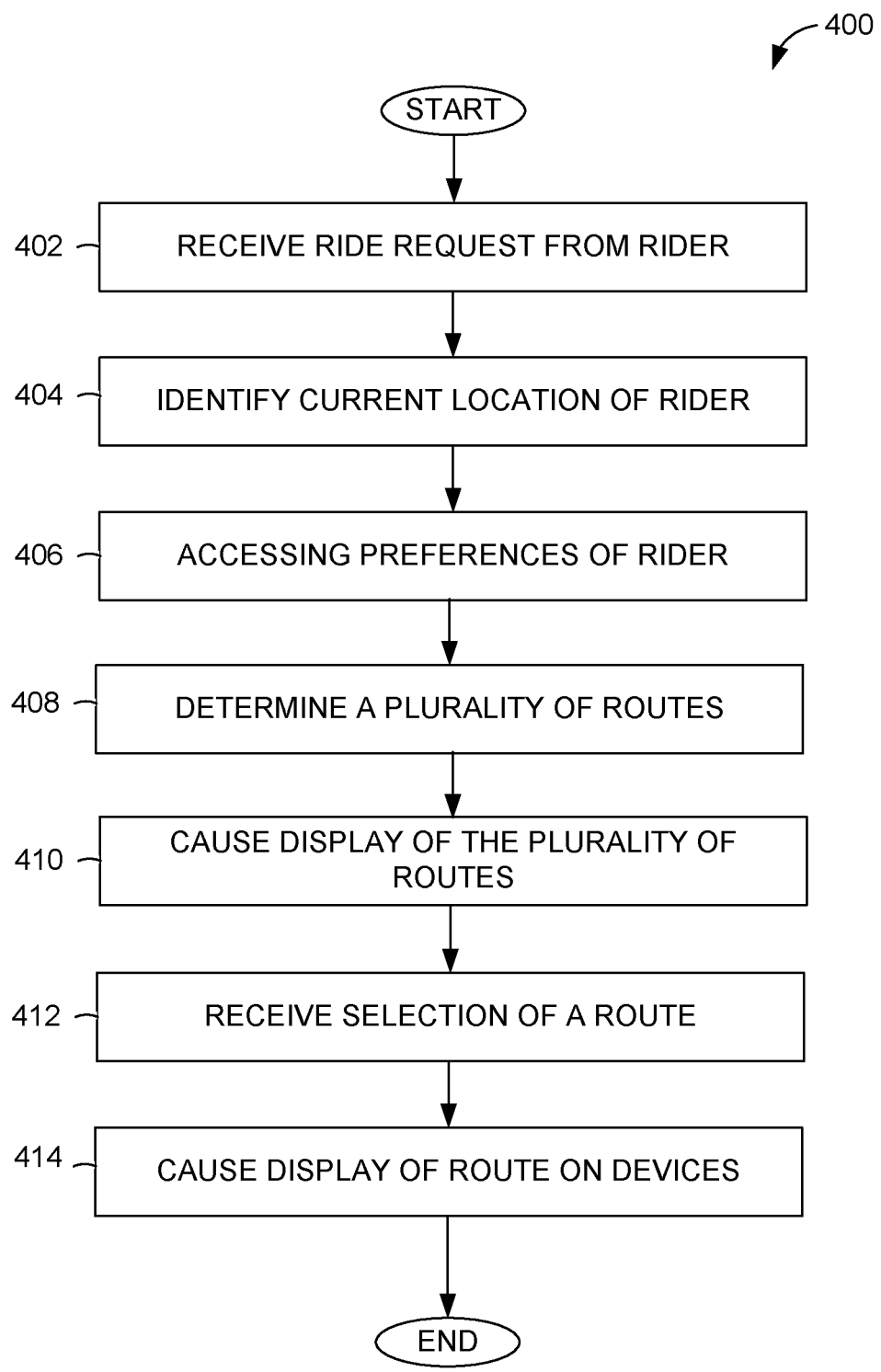
FIG. 4 is a flowchart illustrating operations of a method for providing a rider control of alternate routes, according to some example embodiments.

FIG. 4 is a flowchart illustrating operations of a method 400 for providing a rider control of alternate routes, according to some example embodiments. Operations in the method 400 may be performed by the networked system 102, using components described above with respect to FIG. 2. Accordingly, the method 400 is described by way of example with reference to the networked system 102. However, it shall be appreciated that at least some of the operations of the method 400 may be deployed on various other hardware configurations or be performed by similar components residing elsewhere in the network environment 100. Therefore, the method 400 is not intended to be limited to the networked system 102.

In operation 402, a ride request is received by the device interface 202. In example embodiments, a rider requests transportation service via the client application 108 on their user device 106. The ride request includes a destination that the rider wants to travel to along with device information of the user device 106.

In operation 404, a current location of the rider is determined by the location module 204. In example embodiments, the location module 204 receives, via the network 104 and device interface 202, location information from the user device 106. The location module 204 analyzes the location information to identify the current location of the device 106 and the rider. In some embodiments, the current location is a pick-up location for the rider.

In operation 406, preferences of the rider are accessed. In example embodiments, the route determination module 210 accesses (e.g., via the preference module 208 and/or the account module 206) the preferences of the rider. The preferences are learned by the preference module 208 and stored in a user profile/account managed by the account module in the data storage 214.

In operation 408, the route determination module 210 determines a plurality of routes from the current location of the rider to a destination. In some embodiments, the route determination module 210 determines the plurality of routes based on the machine-learned preferences of the rider. The plurality of routes is determined and displayed to the rider at any time before or during a trip (e.g., prior to booking a ride, prior to the driver picking up the rider (while waiting); upon start of a trip immediately after the rider is picked up; or while the rider is traveling between the pick-up location and the destination).

In one embodiment, the route determination module 210 identifies several routes from the current location to the destination. The route determination module 210 then applies the preferences to the identified routes to determine a top number (e.g., three) of alternate routes. For example, one of the alternate routes is a last route chosen between the two locations or a consistency chosen route between the two locations (e.g., a certain route is always traveled on Tuesdays). Another alternate route can be one that avoids highways.

In some embodiments, weighting is applied by the route determination module 210. For example, if the user has a strong preference for avoiding freeways and a low preference for taking a scenic route, the route determination module 210 can apply a higher weight or coefficient to avoiding freeways and a lower weight for routes with segments that are scenic. In these embodiments, the top number of alternate routes comprises the highest scoring routes based on the weighting.

In operation 410, the plurality of routes is displayed to the rider. In example embodiments, the device interface 202 generates and transmits instructions (or the user interfaces themselves) to the user devices 106 of the rider to cause display of the plurality of alternate routes.

In operation 412, a selection of one of the plurality of routes is received. Thus, the rider reviews the plurality of routes and selects, via the user interface, one of the routes. The selection of the route is stored in the user's account by the account module 206. As discussed above the alternate routes can be displayed to the rider at any time before or during a trip (e.g., prior to booking a ride, prior to the driver picking up the rider (while waiting); upon start of a trip immediately after the rider is picked up; or while the rider is traveling between the pick-up location and the destination). As such, the rider has the ability to select an alternate route at any of these times (e.g., by selecting an alternate route icon to view the alternate routes and selecting one of the alternate routes).

In operation 414, the selected route is displayed on the user devices 106 of both the driver and the rider. In example embodiments, the device interface 202 generates and transmits instructions (or the user interfaces themselves) to the user devices 106 of the driver and the rider to cause display of the selected route. In example embodiments, the route is displayed on the user device 106 of the driver when the driver has picked up the rider.

In some cases, the preferences of the rider are updated based on the selection of the route. Similar to operation 314, the driving preferences of the rider are updated by the preference module 208. Specifically, the preference module 208 analyzes the selected route to identify preferences that may have caused the rider to select the route over other routes that were presented. If necessary, the preferences of the rider are updated by the preference module 208.

In a further embodiment, a user of a delivery service can select a route from a plurality of alternate routes to a drop-off location (e.g., user's apartment). For example, the user orders food from a restaurant (the pick-up location) to be delivered to their apartment in a complex with multiple entrances. The route determination module 210 can determine alternate routes through the complex to the user's apartment. The user can select one of the alternate routes.

Figure 5:
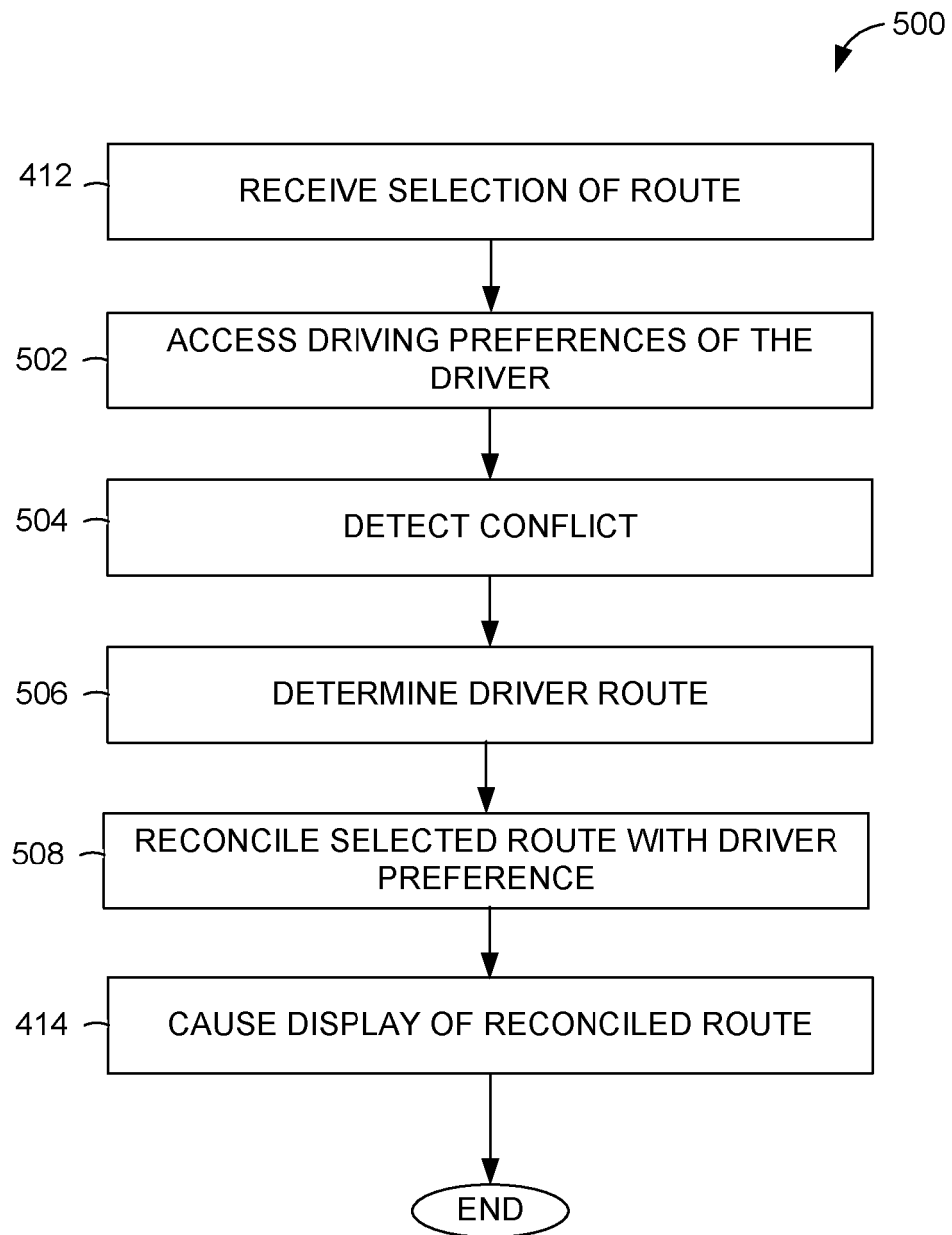
FIG. 5 is a flowchart illustrating operations of a method for reconciling a conflict between a rider selected route and driver preferences, according to some example embodiments.

FIG. 5 is a flowchart illustrating operations of a method 500 for reconciling a conflict between a rider selected route and driver preferences, according to some example embodiments. Operations in the method 500 may be performed by the networked system 102, using components described above with respect to FIG. 2. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102. In example embodiments, the method 500 occurs after receiving the selection of the route from the rider in operation 412.

In operation 502, the driving preferences of the driver are accessed. In example embodiments, the route determination module 210 accesses (e.g., via the preference module 208 and/or the account module 206) the preferences of the driver. The preferences are accessed from a user profile/account of the driver that is managed by the account module.

In operation 504, a conflict is detected between the selected route by the rider and the driving preferences of the driver. In embodiments where the rider selects the route, the route determination module 210 determines whether there is a conflict with the driving preferences of the driver. For example, the rider selects the fast route between two locations, which requires traversing two large hills. If the driver has a strong preference to avoid hills, then there is a conflict. In another example, the rider selects a route that traverses a highway and the driver has a strong preference to avoid highways. Thus, the route determination module 210 compares the characteristics of the selected route to the preferences of the driver and detects there is a conflict.

In operation 506, a driver route is determined. Similar to operation 308, the route determination module 210 identifies several routes from the current location to the destination in accordance with one embodiment. The route determination module 210 then applies the preferences to the identified routes to determine a top number (e.g., three) of alternate routes. Alternatively, the route determination module 210 analyzes the preferences to determine the most important or strong preferences the driver has. Using this analysis, the route determination module 210 then identifies the driver route that best satisfies these preferences. In some embodiments, weighting can be applied by the route determination module 210 in determining the driver route.

In operation 508, the route determination module reconciles the selected route with the driver's preferences to derive the driving route that is eventually used to navigate to the destination. For example, the route determination module 210 replaces one or more segments of the rider selected route (e.g., hilly portion) with a segment from the driver route (e.g., drive along a bottom of hills) or a segment based on the driver preferences—essentially merging the drivers route or preferences with the rider selected route.

In some embodiments, operation 506 may be optional. That is, instead of determining a driver route, the route determination module 210 adjusts the rider selected route using the driver's preferences. For example, if the rider selected route travels along an expressway and the driver prefers to optimize for speed, the route determination module 210 changes the segment of the rider selected route that traverses the expressway with a segment of freeway that travels in the same direction.

Figure 6B:
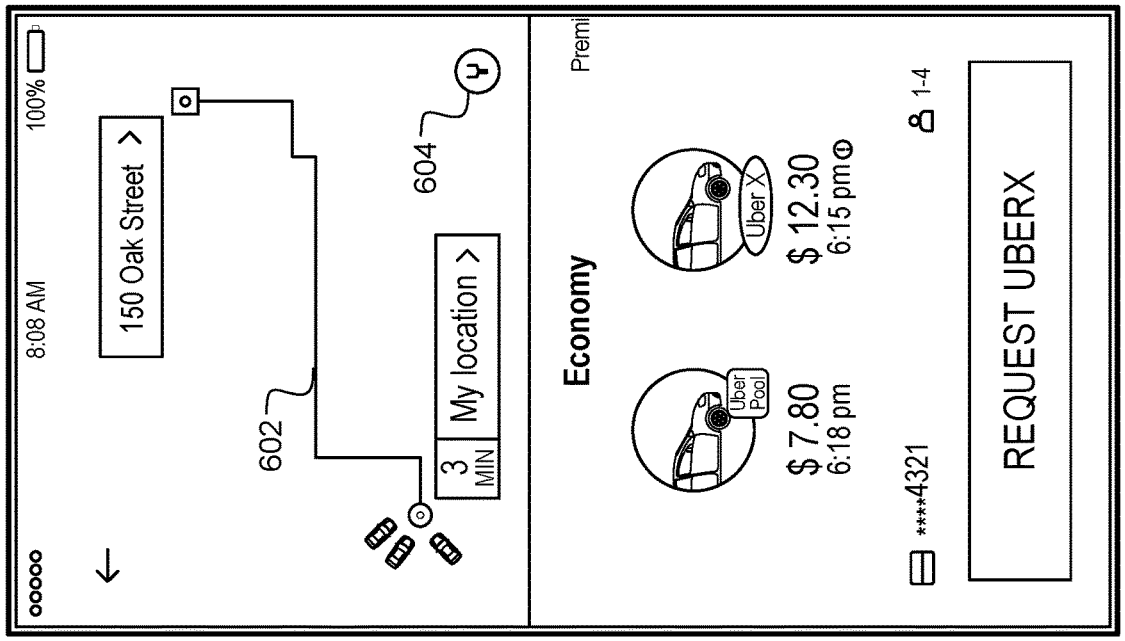
FIG. 6A-FIG. 6E are screenshots of a user interface for providing a rider control of alternate routes.
Figure 6A:
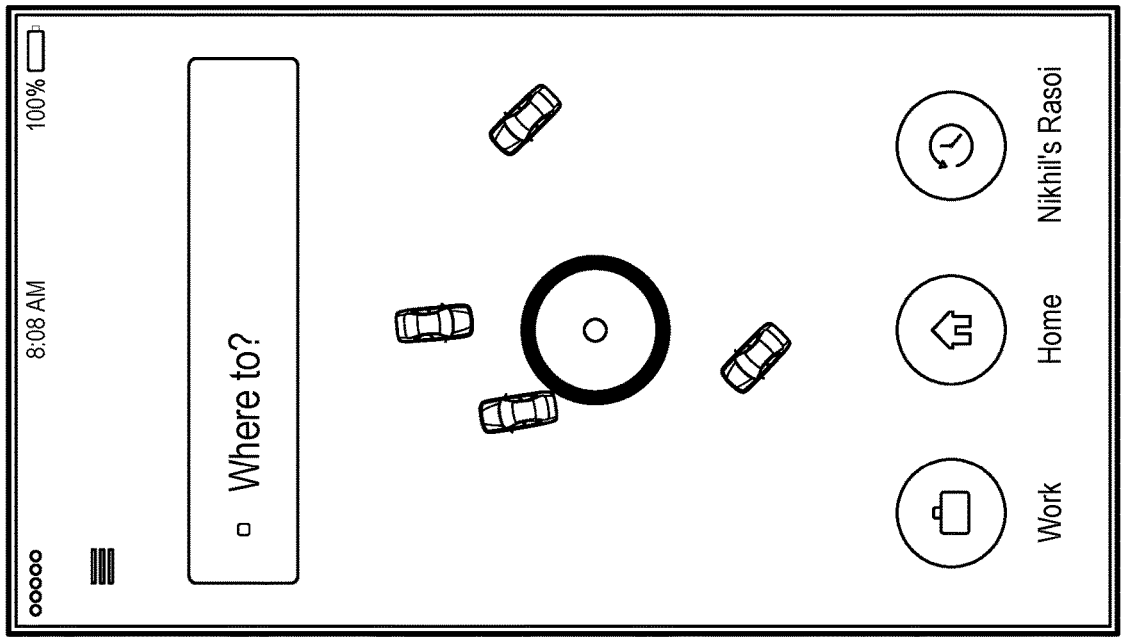

FIG. 6A-FIG. 6E are screenshots of a user interface for providing a rider control of alternate routes. FIG. 6A illustrates a screenshot of the user interface on which the rider requests a ride by indicating a destination or drop-off location. The user can enter the destination or choose from a list of destinations. The rider request is received by the device interface 202.

FIG. 6B illustrates a screenshot of the user interface displaying a recommended route 602 from the rider's pick-up location to the destination. In accordance with one embodiment, the route determination module 210 selects the recommended route 602 for display to the rider that may be, for example, faster or shorter than other routes determined by the route determination module 210. In this embodiment, the user interface includes an alternate route icon 604.

Figure 6C:
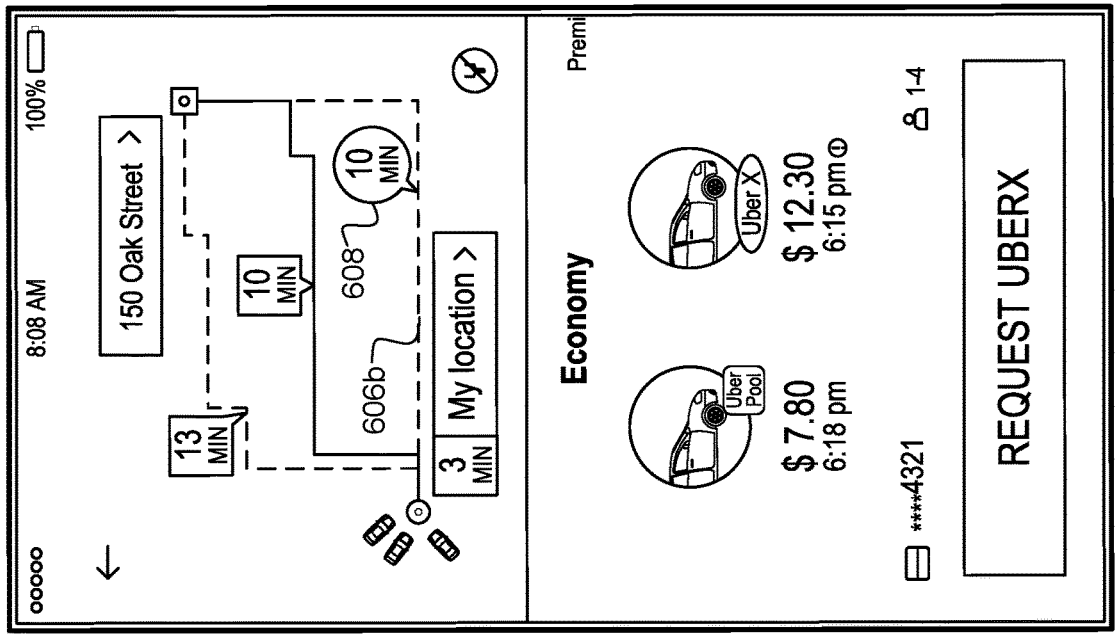

A selection of the alternate route icon 604 causes display of one or more alternate routes 606a and 606b that are visually distinguished (e.g., shown as dashed lines or in a grayed-out or lighter color) from the recommended route 602 as shown in FIG. 6C. In an alternative embodiment, the networked system 102 automatically provides the alternate routes 606a and 606b without the rider having to select the alternate route icon 602.

Figure 6D:
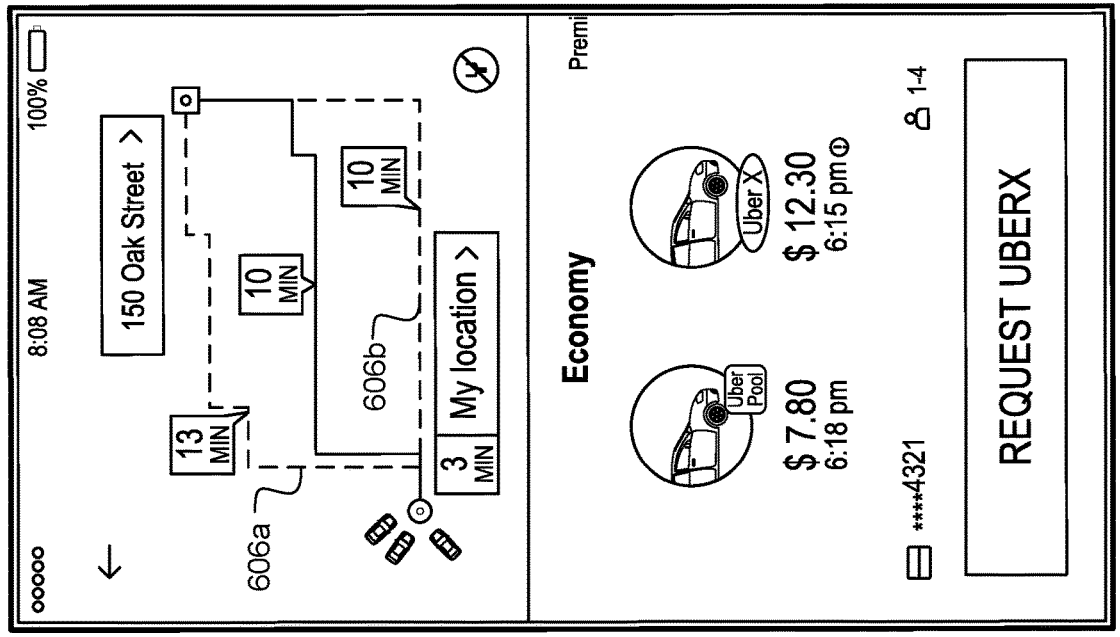
Figure 6E:
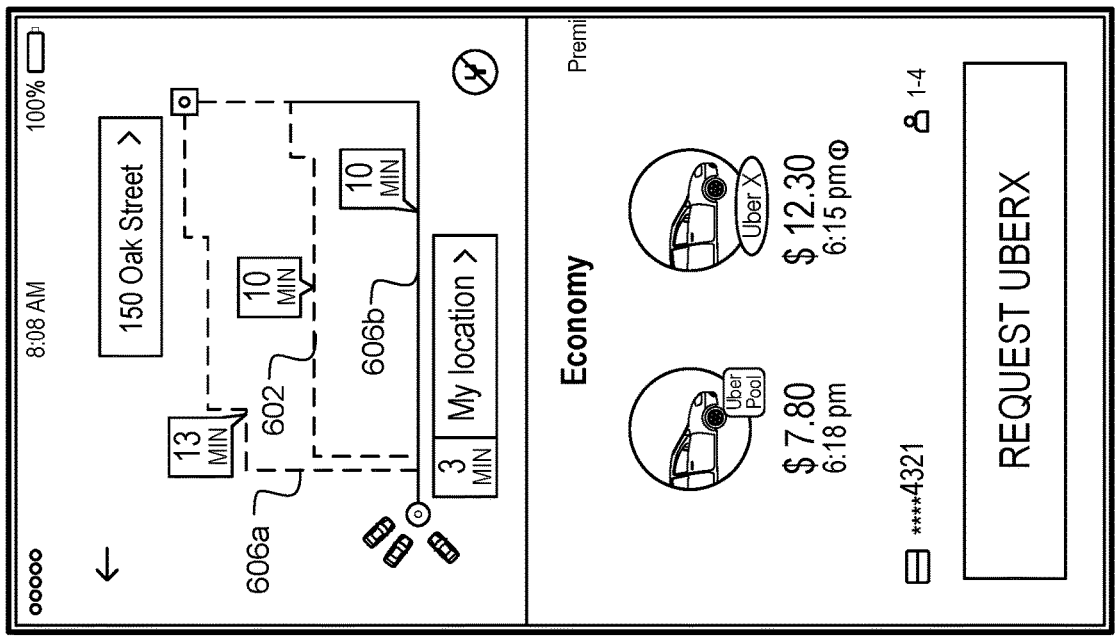

The rider can select one of the alternate routes 606a or 606b if desired. As shown in FIG. 6D, the rider selects (e.g., taps on as shown by a circular icon 608) alternate route 606b. The selection of the alternate route 606b causes the alternate route 606b to become the selected route as shown in FIG. 6E. As such, the display of the alternate route 606a remains unchanged (e.g., dashed line or grayed-out or lighter color) while the recommended route 602 is illustrated as being not selected (e.g., becomes dashed or shown grayed out or lighter in color) and the alternate route 606b becomes the selected route (e.g., shown in solid line).

Figure 7:
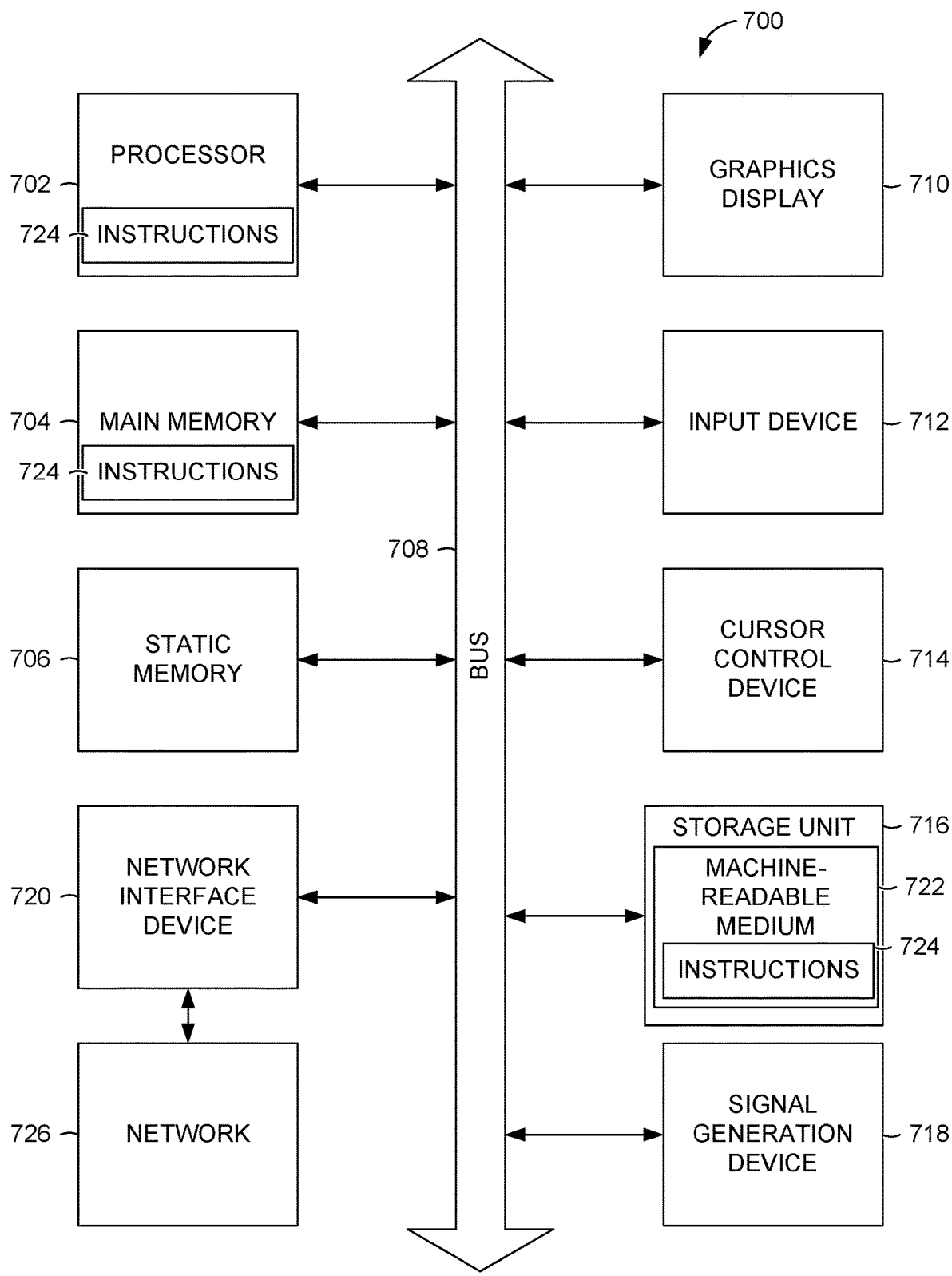
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 3-5. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 (e.g., a tangible machine-readable storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a system for providing driver control of alternate routes. The system includes one or more processors and a storage device storing instructions that, when executed by the one or more hardware processors, causes the one or more hardware processors to perform operations comprising identifying a current location of a vehicle of a driver and a destination of the driver; accessing driving preferences of the driver, the driving preferences including preferences derived from past selection of routes; determining a plurality of routes from the current location of the vehicle to the destination based on the driving preferences; and causing presentation of the plurality of routes on a user interface of a device of the driver.

In example 2, the subject matter of example 1 can optionally include wherein the operations further comprise receiving a selection of a route from the plurality of routes; and updating the preferences based on the selection.

In example 3, the subject matter of examples 1-2 can optionally include wherein the destination comprises a drop-off location for a rider that the driver is transporting in the vehicle; and the one of the plurality of routes comprises a carpool specific route based on the rider being in the vehicle.

In example 4, the subject matter of examples 1-3 can optionally include wherein one of the plurality of routes comprises a route that conserves on vehicle battery usage.

In example 5, the subject matter of examples 1-4 can optionally include wherein one of the plurality of routes comprises a previous or last route taken between the current location and the destination by the driver.

In example 6, the subject matter of examples 1-5 can optionally include wherein the operations further comprise receiving an indication that the vehicle needs gas, and the determining the plurality of routes comprises determining a route that includes a gas station located near a potential pick-up location, the gas station being the destination.

In example 7, the subject matter of examples 1-6 can optionally include wherein the operations further comprise receiving an indication that the driver needs a facility break, and the determining the plurality of routes comprises identifying a route that includes a facility for the break located near a potential pick-up location, the facility being the destination.

In example 8, the subject matter of examples 1-7 can optionally include wherein the operations further comprise identifying the driver as a frequent contributor of user generated content, and the determining the plurality of routes comprises, in response to identifying the driver as a frequent contributor, determining and including a route where new user generated content is needed.

In example 9, the subject matter of examples 1-8 can optionally include wherein the determining the plurality of routes comprises identifying a route that increases a potential for picking up a second rider while traveling to the destination.

Example 10 is a method for providing driver control of alternate routes. The method comprises identifying, by a networked system, a current location of a vehicle of a driver and a destination of the driver; accessing, by the networked system, driving preferences of the driver, the driving preferences including preferences derived from past selection of routes; determining, by a hardware processor of the networked system, a plurality of routes from the current location of the vehicle to the destination based on the driving preferences; and causing presentation of the plurality of routes on a user interface of a device of the driver.

In example 11, the subject matter of example 10 can optionally include receiving a selection of a route from the plurality of routes; and updating the preferences based on the selection.

In example 12, the subject matter of examples 10-11 can optionally include wherein the destination comprises a drop-off location for a rider that the driver is transporting in the vehicle, and the one of the plurality of routes comprises a carpool specific route based on the rider being in the vehicle.

In example 13, the subject matter of examples 10-12 can optionally include wherein one of the plurality of routes comprises a route that conserves on vehicle battery usage.

In example 14, the subject matter of example 10-13 can optionally include wherein one of the plurality of routes comprises a previous or last route taken between the current location and the destination by the driver.

In example 15, the subject matter of examples 10-14 can optionally include receiving an indication that the vehicle needs gas, wherein the determining the plurality of routes comprises determining a route that includes a gas station located near a potential pick-up location, the gas station being the destination.

In example 16, the subject matter of examples 10-15 can optionally include receiving an indication that the driver needs a facility break, wherein the determining the plurality of routes comprises identifying a route that includes a facility for the break located near a potential pick-up location, the facility being the destination.

In example 17, the subject matter of examples 10-16 can optionally include identifying the driver as a frequent contributor of user generated content, wherein the determining the plurality of routes comprises, in response to identifying the driver as a frequent contributor, determining and including a route where new user generated content is needed.

In example 18, the subject matter of examples 10-17 can optionally include wherein the determining the plurality of routes comprises identifying a route that increases a potential for picking up a second rider while traveling to the destination.

Example 19 is a machine-storage medium for providing a driver with control of alternate routes. The machine-storage medium configures one or more processors to perform operations comprising identifying a current location of a vehicle of a driver and a destination of the driver; accessing driving preferences of the driver, the driving preferences including preferences derived from past selection of routes; determining a plurality of routes from the current location of the vehicle to the destination based on the driving preferences; and causing presentation of the plurality of routes on a user interface of a device of the driver.

In example 20, the subject matter of example 19 can optionally include wherein the operations further comprise receiving a selection of a route from the plurality of routes; and updating the preferences based on the selection.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
   one or more hardware processors; and
   a storage device storing instructions that, when executed by the one or more hardware processors, cause the one or more hardware processors to perform operations comprising:
   receiving a rider selection of a route from a rider;
   accessing driving preferences of a driver providing transportation service to the rider, the driving preferences including preferences derived from past selections of routes by the driver;
   detecting a conflict between one or more characteristics of the rider-selected route and the driving preferences of the driver;
   determining one or more routes from a location of a vehicle of the driver to a destination based on the driving preferences;
   reconciling the rider-selected route with the driving preferences of the driver by replacing at least one segment of the rider-selected route with at least one segment from the one or more routes to generate a reconciled route; and
   causing presentation of the reconciled route on a user interface of a device of the driver.

2. The system of claim 1, wherein the operations further comprise:
   receiving an indication that the driver or rider does not agree to the reconciled route; and
   in response to receiving the indication, deriving an alternative reconciled route.

3. The system of claim 1, wherein:
   the destination comprises a drop-off location for the rider that the driver is transporting in the vehicle; and
   determining the one or more routes comprises identifying a carpool specific route based on at least two people being in the vehicle.

4. The system of claim 1, wherein determining the one or more routes comprises identifying a route that conserves on vehicle battery usage.

5. The system of claim 1, wherein determining the one or more routes comprises identifying a previous or last route taken between the current location and the destination by the driver.

6. The system of claim 1, wherein:
the operations further comprise receiving an indication that the vehicle needs gas; and
the determining the one or more routes comprises determining a route that includes a gas station.

7. The system of claim 1, wherein:
the operations further comprise receiving an indication that the driver needs a facility break; and
the determining the one or more routes comprises identifying a route that includes a facility for the break.

8. The system of claim 1, wherein the operations further comprise:
receiving an indication that the driver or rider does not agree to the reconciled route; and
in response to receiving the indication, initiating a negotiation process between the driver and rider via the device of the driver and a device of the rider.

9. The system of claim 1, wherein the determining the one or more routes comprises identifying a route that increases a potential for picking up a second rider while traveling to the destination.

10. A method comprising:
receiving, by a networked system, a rider selection of a route from a rider;
accessing, by the networked system, driving preferences of a driver providing transportation service to the rider, the driving preferences including preferences derived from past selections of routes by the driver;
detecting a conflict between one or more characteristics of the rider-selected route and the driving preferences of the driver;
determining, by a hardware processor of the networked system, one or more routes from a location of a vehicle of the driver to a destination based on the driving preferences;
reconciling the rider-selected route with the driving preferences of the driver by replacing at least one segment of the rider-selected route with at least one segment from the one or more routes to generate a reconciled route; and
causing presentation of the reconciled route on a user interface of a device of the driver.

11. The method of claim 10, further comprising:
receiving an indication that the driver or rider does not agree to the reconciled route; and
in response to receiving the indication, deriving an alternative reconciled route.

12. The method of claim 10, wherein:
the destination comprises a drop-off location for the rider that the driver is transporting in the vehicle; and
determining the one or more routes comprises identifying a carpool specific route based on at least two people being in the vehicle.

13. The method of claim 10, wherein determining the one or more routes comprises identifying a route that conserves on vehicle battery usage.

14. The method of claim 10, wherein determining the one or more routes comprises identifying a previous or last route taken between the current location and the destination by the driver.

15. The method of claim 10, further comprising receiving an indication that the vehicle needs gas, wherein the determining the one or more routes comprises determining a route that includes a gas station.

16. The method of claim 10, further comprising receiving an indication that the driver needs a facility break, wherein the determining the one or more routes comprises identifying a route that includes a facility for the break.

17. The method of claim 10, further comprising:
receiving an indication that the driver or rider does not agree to the reconciled route; and
in response to receiving the indication, initiating a negotiation process between the driver and rider via the device of the driver and a device of the rider.

18. The method of claim 10, wherein the determining the one or more routes comprises identifying a route that increases a potential for picking up a second rider while traveling to the destination.

19. A non-transitory machine storage medium storing instructions that, when executed by one or more hardware processors of a machine, cause the machine to perform operations comprising:
receiving a rider selection of a route from a rider;
accessing driving preferences of a driver providing transportation service to the rider, the driving preferences including preferences derived from past selections of routes by the driver;
detecting a conflict between one or more characteristics of the rider-selected route and the driving preferences of the driver;
determining one or more routes from a location of a vehicle of the driver to the destination based on the driving preferences;
reconciling the rider-selected route with the driving preferences of the driver by replacing at least one segment of the rider-selected route with at least one segment from the one or more routes to generate a reconciled route; and
causing presentation of the reconciled route on a user interface of a device of the driver.

20. The machine storage medium of claim 19, wherein the operations further comprise:
receiving an indication that the driver or rider does not agree to the reconciled route; and
in response to receiving the indication, deriving an alternative reconciled route.

* * * * *